United States Patent
Adur et al.

[11] Patent Number: 6,068,897
[45] Date of Patent: May 30, 2000

[54] DUAL OVENABLE PAPERBOARD STRUCTURES HAVING UNIQUE ADHESIVE TIE MATERIALS

[75] Inventors: Ashok M. Adur, Ramsey, N.J.; Thomas Z. Fu, Croton, N.Y.

[73] Assignee: International Paper Company, Tuxedo Park, N.Y.

[21] Appl. No.: 09/288,854

[22] Filed: Apr. 9, 1999

Related U.S. Application Data

[63] Continuation-in-part of application No. 08/942,541, Oct. 1, 1997.

[51] Int. Cl.[7] .................................................. B32B 23/08
[52] U.S. Cl. ..................... 428/34.2; 428/341; 428/342; 428/483; 428/511
[58] Field of Search ............................. 428/34.2, 341, 428/342, 483, 511

[56] References Cited

U.S. PATENT DOCUMENTS

| | | | |
|---|---|---|---|
| Re. 32,270 | 10/1986 | Murray, Jr. ............................ | 428/335 |
| 3,904,104 | 9/1975 | Kane ...................................... | 229/3.5 |
| 3,939,025 | 2/1976 | Kane ...................................... | 156/224 |
| 3,967,998 | 7/1976 | Kane ...................................... | 156/226 |
| 4,387,126 | 6/1983 | Rebholz ................................. | 428/35 |
| 4,391,833 | 7/1983 | Self et al. ............................... | 426/523 |
| 4,455,184 | 6/1984 | Thompson ........................ | 156/244.11 |
| 4,573,832 | 3/1986 | Zinner ..................................... | 407/70 |
| 4,595,611 | 6/1986 | Quick et al. ............................ | 428/35 |
| 4,698,246 | 10/1987 | Gibbons et al. ......................... | 428/35 |
| 4,762,748 | 8/1988 | Oberle ..................................... | 428/516 |
| 4,765,999 | 8/1988 | Winter ..................................... | 426/113 |
| 4,806,398 | 2/1989 | Martin, Jr. ............................. | 428/34.2 |
| 4,900,594 | 2/1990 | Quick et al. ........................... | 428/34.2 |
| 4,939,036 | 7/1990 | Reith ....................................... | 428/349 |
| 4,956,207 | 9/1990 | Kauffman et al. ..................... | 428/34.2 |
| 5,418,208 | 5/1995 | Takeda et al. .......................... | 503/227 |

Primary Examiner—David W. Wu
Assistant Examiner—Caixia Lu-Rutt
Attorney, Agent, or Firm—Hoffman, Wasson & Gitler; Michael J. Doyle

[57] ABSTRACT

A paperboard-based laminated structure for containers produced by co-extrusion coating or lamination of a polyethylene terephthalate layer as the product contact layer and a unique tie-layer on to paperboard, where the tie-layer is specifically ethylene-ethyl or butyl acrylate copolymer or terpolymer. This paperboard structure provides high temperature end-use performance required in dual-ovenable applications and cost savings.

8 Claims, 1 Drawing Sheet

DUAL OVENABLE PAPERBOARD STRUCTURES HAVING UNIQUE ADHESIVE TIE MATERIALS

This application is a continuation in part of application Ser. No. 08/942,541, filed on Oct. 1, 1997.

BACKGROUND OF THE INVENTION

The invention addresses a polymer coated paperboard which is an improvement over current structures and can be utilized for dual ovenable applications. The polymer coating contains a product contact layer of a polyethylene terephthalate polyester. The structure makes use of an unique adhesive tie material selected from the group including ethylene-ethyl acrylate copolymer, ethylene-butyl acrylate copolymer, ethylene-ethyl acrylate-maleic anhydride terpolymer, and ethylene-butyl acrylate-maleic anhydride terpolymer. The unique adhesive tie material may be combined with an antioxidant and/or inorganic fillers.

In the past, dual ovenable containers have been constructed from a laminate containing paperboard, a tie layer of ethylene-methyl acrylate (EMA), ethylene-vinyl acetate copolymers, acrylic acid copolymers, physical blends of polyethylene with about 20% polyethylene terephthalate (PET) or physical blends of ethylene-methyl acrylate with polyethylene terephthalate. See U.S. Pat. No. 4,455,184.

The unique tie materials for polyethylene terephthalate of the present invention are neither discussed nor suggested by the '184 patent. These tie materials can withstand high temperature conditions and remain stable. This allows the container produced to exhibit the necessary and superior cooking performance. The superior adhesive tie materials and resultant structures allow for coating weights of the polyester to be below 25 lbs/3,000 sq. ft., something not previously successfully practical with prior polyethylene terephthalate structures. In the past, weights below 25 lbs/3,000 sq. ft. of polyethylene terephthalate exhibited poor adhesion to the paperboard substrate, in addition to deleterious pinholes formed therein. Reduction of the coating weights of the product contact layer provided significant economic savings in production of the structure, and can be accomplished through the use of the unique adhesive tie materials which incorporate an antioxidant.

It is an object of the present invention to produce a coating for contact with a product in a dual ovenable container that is less costly than conventional structures and maintains product quality.

It is a further object of the present invention to reduce coating neck-in and therefor reduce paperboard trimming requirements and thus reduce paperboard waste.

It is yet a further object of the present invention to increase adhesion of the product contact layer coating to paperboard.

Another object of the present invention is to increase flexibility of the coating structure.

Another object of the present invention is to increase coating line speed without causing detrimental effect on the quality of products being produced.

Yet another object of the present invention is the production of high temperature cooking coated paper containers.

SUMMARY OF THE INVENTION

The invention covers structures of coated paperboard for packaging applications and methods of producing and using them. The structure is made from a laminate having a paperboard substrate, an unique adhesive tie layer having an antioxidant incorporated therein and a polyester product contact layer.

DETAILED DESCRIPTION OF THE PREFERRED EMBODIMENTS

Figure 1:
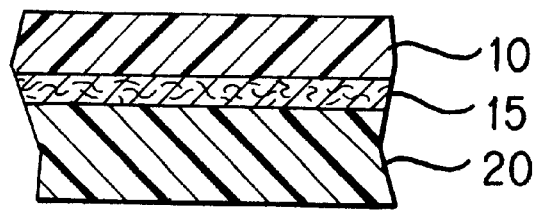
FIG. 1 is a cross-section of a laminate embodying the present invention.
Figure 2:
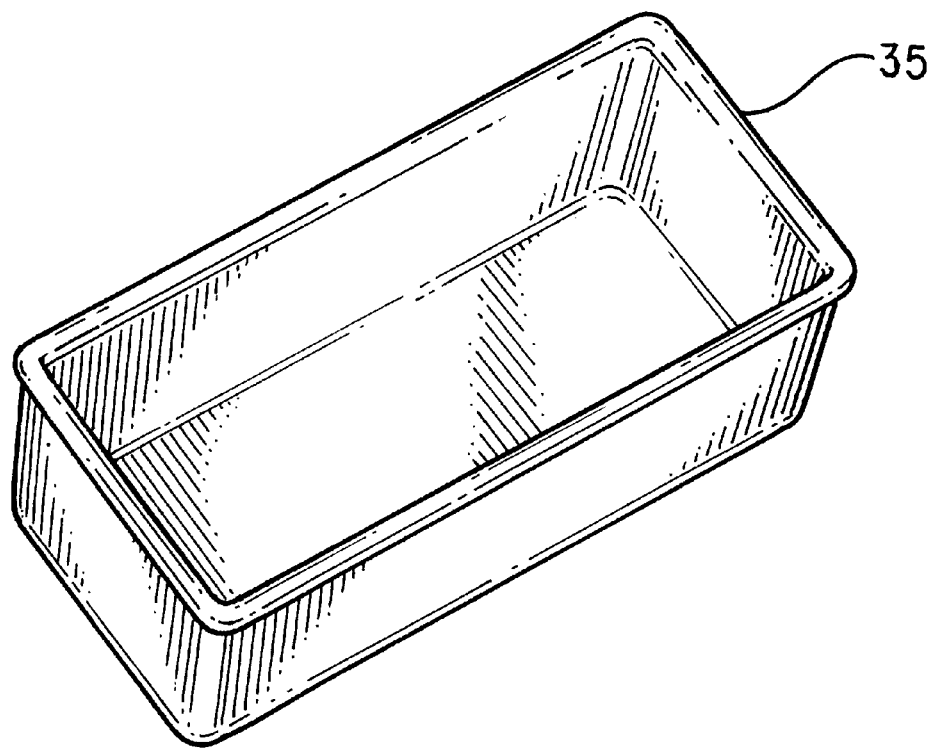
FIG. 2 is a perspective view of one type of container formed from the laminate of the present invention.

The inventive structure is depicted in cross-section in FIG. 1. A product contact coating 10 of a polyethylene terephthalate polyester material is extruded or coextruded with an unique adhesive tie layer having, if desired, an antioxidant incorporated therein 15, and a paperboard substrate 20. The product contact layer has a coating weight ranging from 4–35 lbs/3,000 sq. ft., although it is preferred to have a coating weight of 10–12 lbs/3,000 sq. ft. The extruded or coextruded unique adhesive tie layer with antioxidant incorporated thereon has a coating weight ranging from 13–30 lbs/3,000 sq. ft. with a preferred weight range being from 3–6 lbs/3,000 sq. ft. If desired, prior to extrusion the paperboard surface is treated by on-line flame treatment or corona treatment to enhance tie layer adhesion to board.

The unique extrudable adhesive tie layer can be selected from: ethylene-ethyl acrylate copolymers; ethylene-butyl acrylate copolymers, ethylene-ethyl acrylate-maleic anhydride terpolymers, or ethylene-butyl acrylate-maleic anhydride terpolymers.

Additionally, the tie layer can include or be filled with from 0–60 wt % inorganic fillers, preferably from 15–30 wt %. Representative of fillers are calcium carbonate, clay, titanium dioxide and silica. The fillers enhance the stiffness and heat stability of the tie layer and thereby the entire bilayer layer coating structure.

The tie layer may also contain an antioxidant additive, preferably a hindered phenol such as 3,5-bis(1,1-dimethylethyl)4-hydroxybenzenepropanoic acid, 2,2-bis[[3-[3,5-bis(1,1-dimethyl-ethyl)-4-hydroxyphenyl]-1-oxopropoxy]methyl]1,3-propanediyl ester sold under the trade name Irganox 1010 made by Ciba-Geigy.

The invention focuses on a laminate structure or container for dual ovenable applications. Dual ovenable structures work well in both conventional and microwave oven environments.

The structure comprises:

a paperboard substrate;

an extrudable tie layer selected from the group consisting of ethylene ethyl acrylate copolymer, ethylene ethyl acrylate-maleic anhydride terpolymer, and ethylene-butyl acrylate-maleic anhydride terpolymer; the extrudable tie layer further including a hindered phenol antioxidant compound selected from the group consisting of 3,5-bis(1,1-dimethylethyl)-4-hydroxy-benzenepropanoic acid, 2,2-bis[[3-[3,5-bis(1,1-dimethyl-ethyl)-4-hydroxyphenyl]-1-oxopropoxy] methyl]1,3-propanediyl ester; the hindered phenol being present in the tie layer in an amount of from 0.25 to 0.35 wt. %; and a product contact layer of polyethylene terephthalate.

The unique structure allows for superior cooking performance with tie materials that can withstand high temperature conditions and remain stable.

The selected and claimed hindered phenol antioxidants are critical to obtain a stable container for dual ovenable applications.

A cooking comparison test was performed with the novel structures claimed, versus the Thompson et al reference disclosure.

| Materials | |
|---|---|
| tie layers (see specification) | (TIE) |
| polyethylene terephthalate | (PET) |
| ethylene methyl acrylate | (EMA) |
| hindered phenol antioxidant | (AO) |
| bleached SBS paperboard | (BD) |
| Parameters | |
| Microwave | high power, 6 minutes |
| Gas | 375° F., 30 minutes |

Before cooking, all tray samples were filled with Hormel® chili, sealed with 50 OL Mylar film using a tacking iron, stored in freezer (−10° F.) overnight. The frozen trays were placed in the oven directly for cooking.

| Structure Tie Layer | Level of AO in Tie Layer | Microwave Oven | Gas Oven |
|---|---|---|---|
| 1. PET/EMA/BD | 0% wt | no coating delamination | severe delamination |
| 2. PET/TIE + AO/BD | 0.15% wt | coating delamination | no coating delamination |
| 3. PET/TIE + AO/BD | 0.25% wt | no coating delamination | no coating delamination |
| 4. PET/TIE + AO/BD | 0.35% wt | no coating delamination | no coating delamination |
| 5. PET/TIE + AO/BD | 0.45% wt | coating delamination | no coating delamination |
| 6. PET/TIE + AO/BD | 0.55% wt | unacceptable blisters | no coating delamination |

The tests showed only samples #3 and #4 were acceptable. Thompson is depicted in Example #1.

The results showed that the optimal use level of the AO concentrate for the dual ovenable application would be from 0.25% wt to 0.35% wt. Typically in almost all antioxidant usage, the conventional wisdom is that as one increases the antioxidant level the performance steadily increases till it reaches a plateau and beyond that it stays at the plateau. In this particular system, we found unexpectedly, that as we increased the antioxidant beyond the sweet spot of about 0.25 to 0.35%, where performance is excellent, the performance drops off to being unacceptable. This is unexpected to one skilled in the art and hence unique. We respectfully assert that this unexpected finding is critical and not taught or rendered by Thompson in view of Kauffman et al.

In developing the claimed structure, numerous conventional antioxidants were tested in the adhesive tie layers and they failed to produce a stable structure. Further, these structures had pinholes and were inoperative to produce the structure desired.

The selected hindered phenol antioxidants claimed provided an unexpected result.

Kauffman et al., cited by the office, as a teaching of the use of antioxidants with adhesives for stability, nowhere discloses nor suggest the hindered phenol antioxidants used and claimed by Applicant.

The Office in their action of Aug. 17, 1998, expressly states, "Although the particular types of phenol compounds cited by the applicants are not specifically mentioned by Kauffman, it would have been obvious to use any known hindered antioxidant phenol in the adhesives given the broad teachings of Kauffman and in the absence of a showing of criticality or unexpected results." (page 5, column 2)

The selection of the hindered phenol antioxidant of the present invention is critical and does provide the unexpected result of stability in conventional and microwave oven environments (dual ovenable).

Kauffman et al. does not teach the use of the hindered phenol antioxidants of the application in the specific extrudable adhesive tie layer for tying polyethylene to paperboard.

In view of the criticality of the composition of the adhesive tie layer and its unexpected result, vis-a-vis the failures of other conventional antioxidants during testing, it is respectfully requested that the U.S. Patent Office reconsider its position on the combination of Thompson '184, Oberle et al., and Kauffman et al.

The coated board can be converted into many different types of packaging containers such as dual ovenable trays, eat-in-boxes, and gable-top cartons.

It is further possible, if desired, to coat the uncoated exterior of the paperboard substrate with suitable thermoplastic polymers. Such can be followed with printing onto the structure.

The basis weight of the paperboard can vary from 80 lbs/3,000 sq. ft. to 380 lbs/3,000 sq. ft., with a preference of (140–280 lbs)/3,000 sq. ft. Applying both adhesive tie layer and product contact layer to the substrate can be achieved by either coextrusion coating both layers onto paper or lamination of biaxially oriented product contact layer in a film onto paper using a tie layer by standard lamination or extrusion lamination processes.

The use of new and unique higher melting material adhesive tie layers with antioxidants and fillers as heat stability and strength additives provide a significant advance over the existing polyethylene terephthalate structures achieving the necessary high temperature end-use performance and cost savings required.

It is understood that the invention is not confined to the particular embodiments described herein, but embraces all modified forms thereof which come within the scope of the claims.

We claim:

1. A laminate structure for dual ovenable applications comprising:
   a) a paperboard substrate;
   b) an extrudable tie layer selected from the group consisting of ethylene-ethyl acrylate copolymer, ethylene-butyl acrylate copolymer, ethylene-ethyl acrylate-maleic anhydride terpolymer, and ethylene-butyl acrylate-maleic anhydride terpolymer and a hindered phenol antioxidant selected from the group consisting of 3,5-bis(1,1-dimethylethyl)-4-hydroxybenzene-propanoic acid, and 2,2-bis[[3-[3,5-bis(1,1-dimethylethyl)-4-hydroxyphenyl]-1-oxopropoxy]methyl]1,3-propanediyl ester, said hindered phenol being present in said tie layer in an amount of from approximately 0.25 to 0.35 wt %; and
   c) a layer of polyethylene terephthalate bonded to said substrate by said tie layer.

2. The laminate structure as claimed in claim 1, wherein said extrudable tie layer further comprises an inorganic filler in an amount up to 60 wt % of said tie layer to enhance stiffeners and heat stability of said layer.

3. The laminate structure as claimed in claim 1, wherein said tie layer has a coating weight of from 1–30 lbs/3,000 sq. ft.

4. The laminate structure as claimed in claim 1, wherein said layer of polyethylene terephthalate has a coating weight of from 4–35 lbs/3,000 sq. ft.

5. A container made from a laminate structure for dual ovenable applications comprising:
   a) a paperboard substrate;
   b) an extrudable tie layer selected from the group consisting of ethylene-ethyl acrylate copolymer, ethylene-butyl acrylate copolymer, ethylene-ethyl acrylate-maleic anhydride terpolymer, and ethylene-butyl acrylate-maleic anhydride terpolymer and a hindered phenol antioxidant selected from the group consisting of 3,5-bis(1,1-dimethylethyl)-4-hydroxybenzene-propanoic acid, and 2,2-bis[[3-[3,5-bis(1,1-dimethylethyl)-4-hydroxyphenyl]-1-oxopropoxy] methyl]1,3-propanediyl ester, said hindered phenol being present in said tie layer in an amount of from approximately 0.25 to 0.35 wt %; and
   c) a layer of polyethylene terephthalate bonded to said substrate by said tie layer.

6. The laminate structure as claimed in claim 5, wherein said extrudable tie layer further comprises an inorganic filler in an amount up to 60 wt % of said tie layer to enhance stiffeners and heat stability of said layer.

7. The laminate structure as claimed in claim 5, wherein said tie layer has a coating weight of from 1–30 lbs/3,000 sq. ft.

8. The laminate structure as claimed in claim 5, wherein said layer of polyethylene terephthalate has a coating weight of from 4–35 lbs/3,000 sq. ft.

* * * * *